US011472300B2

(12) United States Patent
Carpenter

(10) Patent No.: US 11,472,300 B2
(45) Date of Patent: Oct. 18, 2022

(54) CHARGE PORT ILLUMINATION SYSTEM AND ILLUMINATION METHOD

(71) Applicant: Ford Global Technologies, LLC, Dearborn, MI (US)

(72) Inventor: Toussaint Carpenter, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 214 days.

(21) Appl. No.: 16/826,618

(22) Filed: Mar. 23, 2020

(65) Prior Publication Data

US 2021/0291673 A1    Sep. 23, 2021

(51) Int. Cl.
*B60L 53/16* (2019.01)
*H02J 7/00* (2006.01)
*H05B 47/18* (2020.01)
*H01R 13/74* (2006.01)
*H01R 13/52* (2006.01)
*B60L 53/67* (2019.01)
*B60L 58/12* (2019.01)
*B60Q 3/30* (2017.01)
*B60Q 3/80* (2017.01)
*H01R 13/717* (2006.01)

(52) U.S. Cl.
CPC .............. *B60L 53/16* (2019.02); *B60L 53/67* (2019.02); *B60L 58/12* (2019.02); *B60Q 3/30* (2017.02); *B60Q 3/80* (2017.02); *H01R 13/5213* (2013.01); *H01R 13/7175* (2013.01); *H01R 13/74* (2013.01); *H02J 7/0045* (2013.01); *H02J 7/0048* (2020.01); *H05B 47/18* (2020.01); *H01R 2201/26* (2013.01)

(58) Field of Classification Search
CPC .............................. B60L 53/16; H02J 7/0048
USPC ......................................................... 320/109
See application file for complete search history.

(56) References Cited

U.S. PATENT DOCUMENTS

| | | | |
|---|---|---|---|
| 8,134,334 B2 | 3/2012 | Suzuki et al. | |
| 8,905,612 B2 | 12/2014 | Sawayanagi | |
| 8,988,204 B2 | 3/2015 | Suzuki et al. | |
| 9,293,932 B2 | 3/2016 | Ohtomo | |
| 9,457,673 B2 | 10/2016 | Masuda et al. | |
| 2012/0025765 A1* | 2/2012 | Frey | B60L 53/16 320/109 |
| 2012/0083148 A1* | 4/2012 | Hirashita | H01R 13/639 439/304 |
| 2013/0074985 A1* | 3/2013 | Ferguson | F01M 11/0458 141/98 |
| 2014/0009112 A1* | 1/2014 | Fontana | B60L 53/665 320/109 |
| 2015/0035478 A1* | 2/2015 | Uchiyama | B60L 58/27 320/107 |

(Continued)

*Primary Examiner* — Suchin Parihar
(74) *Attorney, Agent, or Firm* — David B. Kelley; Carlson, Gaskey & Olds, P.C.

(57) ABSTRACT

A charge port illumination system includes, among other things, a first charge port assembly having a charge port, a courtesy lamp assembly configured to selectively activate to illuminate the charge port, and indicators each configured to selectively activate to illuminate and indicate a state of charge of a traction battery. The system further includes a microcontroller that selectively activates the courtesy lamp assembly and selectively activates the plurality of indicators of the first charge port assembly.

19 Claims, 2 Drawing Sheets

(56) References Cited

U.S. PATENT DOCUMENTS

| | | | |
|---|---|---|---|
| 2016/0129800 A1* | 5/2016 | Mauter | B60L 53/62 320/109 |
| 2016/0172897 A1* | 6/2016 | Iisaka | B60L 53/18 320/107 |
| 2016/0219800 A1* | 8/2016 | Choi | G02B 19/00 |
| 2019/0378365 A1* | 12/2019 | Jordan, III | G07C 9/00896 |
| 2020/0247261 A1* | 8/2020 | Kojima | H02J 7/00034 |
| 2021/0288455 A1* | 9/2021 | Stack | B60K 1/04 |
| 2022/0051492 A1* | 2/2022 | Badger, II | B60L 53/16 |

* cited by examiner

CHARGE PORT ILLUMINATION SYSTEM AND ILLUMINATION METHOD

TECHNICAL FIELD

This disclosure relates generally to illuminating a charge port of an electrified vehicle.

BACKGROUND

Electrified vehicles differ from conventional vehicles because electrified vehicles can be selectively driven using one or more electric machines powered by a traction battery. The electric machines can drive the electrified vehicles instead of, or in addition to, an internal combustion engine. Some electrified vehicles include a charge port that is connectable to a charger when charging the traction battery from an external power source.

SUMMARY

A charge port illumination system according to an exemplary embodiment of the present disclosure includes, among other things, a first charge port assembly having a charge port, a courtesy lamp assembly configured to selectively activate to illuminate the charge port, and indicators each configured to selectively activate to illuminate and indicate a state of charge of a traction battery. The system further includes a microcontroller that selectively activates the courtesy lamp assembly and selectively activates the plurality of indicators of the first charge port assembly.

In another example of the foregoing system, the microcontroller is a LIN microcontroller.

In another example of any of the foregoing systems, the microcontroller is configured to selectively activate the courtesy lamp assembly by communicating a first LIN message to the courtesy lamp assembly and to selectively activate at least one of the plurality of indicators by communicating a second LIN message to the at least one of the plurality of indicators.

In another example of any of the foregoing systems, the charge port assembly is a first charge port assembly. The microcontroller is configured to be alternatively used with a different, second charge port assembly and activates a charger unlock button of the second charge port assembly by communicating the first LIN message to the charger unlock button to cause the charger unlock button to illuminate.

In another example of any of the foregoing systems, the second charge port assembly includes a second charge port and second indicators distributed circumferentially about the second charge port. The microcontroller is configured to selectively activate at least one of the second indicators by communicating the second LIN message to the at least one of the second indicators to cause the at least one of the second indicators to illuminate.

Another example of any of the foregoing systems includes a charge port door moveable between a closed position and an open position. The charge port is covered by the charge port door when the charge port door is in the closed position. The charge port is uncovered by the charge port door when the charge port door is in the open position.

In another example of any of the foregoing systems, the courtesy lamp assembly and the indicators are covered by the charge port door in the closed position, and the courtesy lamp assembly and the indicators are uncovered by the charge port door in the open position.

In another example of any of the foregoing systems, the microcontroller is configured to activate the courtesy lamp assembly such that the courtesy lamp assembly is illuminated when the charge port door is open and is not illuminated when the charge port door is closed.

Another example of any of the foregoing systems includes a charger unlock button. The indicators are distributed circumferentially about the charger unlock button.

In another example of any of the foregoing systems, the courtesy lamp assembly is disposed vertically above the charge port.

In another example of any of the foregoing systems, the courtesy lamp assembly includes at least one Light Emitting Diode. Each of the indicators includes at least one Light Emitting Diode.

A charge port illumination system according to another exemplary embodiment of the present disclosure includes a first charge port assembly having a charge port of an electrified vehicle, a courtesy lamp assembly that is disposed vertically above the charge port and is configured to selectively illuminate the charge port, indicators each configured to selectively illuminate to indicate a state of charge of a traction battery, and a charger unlock button. The indicators are distributed circumferentially about the charger unlock button. The system further includes a charge port door moveable between a closed position and an open position. The charge port is covered by the charge port door when the charge port door is in the closed position. The charge port is uncovered by the charge port door when the charge port door is in the open position. The courtesy lamp assembly and the indicators are covered by the charge port door in the closed position. The courtesy lamp assembly and the indicators are uncovered by the charge port door in the open position. The system further includes a LIN microcontroller that controls illumination of both the courtesy lamp assembly and the indicators. The microcontroller is configured to activate the courtesy lamp assembly using a first LIN message and to activate the indicators using at least one second LIN message. The LIN microcontroller is configured such that the LIN microcontroller can be alternatively used in connection with a different, second charge port assembly where the LIN microcontroller activates a charger unlock button of the second charge port assembly using the first LIN message.

A charge port illumination method according to yet another exemplary embodiment of the present disclosure includes activating a courtesy lamp of a first charge port assembly in response to at least one first LIN message sent from a microcontroller. The courtesy lamp assembly illuminates a charge port of the first charge port assembly when activated. The method further includes activating at least one indicator of the first charge port assembly in response to at least one second LIN message sent from the microcontroller. The at least one indicator illuminating to indicate a state of charge of a traction battery.

In another example of the foregoing method, the microcontroller activates the courtesy lamp and the at least one indicator when a charge port door is an open position, and deactivates the courtesy lamp and the at least one indicator when the charge port door is in a closed position.

In another example of any of the foregoing methods, the charge port, the courtesy lamp, and the indicators are covered by the charge port door when the charge port door is in the closed position. The charge port, the courtesy lamp, and the indicators are uncovered by the charge port door when the charge port door is in the open position.

In another example of any of the foregoing methods, the indicators are distributed circumferentially about a charger unlock button of the first charge port assembly.

In another example of any of the foregoing methods, the courtesy lamp is vertically directly above the charge port.

In another example of any of the foregoing methods, the courtesy lamp includes at least one Light Emitting Diode. Each of the indicators includes at least one Light Emitting Diode.

In another example of any of the foregoing methods, the microcontroller is configured such that the microcontroller can be alternatively used in connection with a different, second charge port assembly where the microcontroller activates a charger unlock button of the second charge port assembly using the at least one first LIN message.

In another example of any of the foregoing methods, the microcontroller within the second charge port assembly is configured to activate at least one second indicator of the second charge port assembly using the at least one second LIN message. The second indicators are distributed circumferentially about a charge port of the second charge port assembly to illuminate the charge port of the second charge port assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to illuminating a charge port of an electrified vehicle. In particular, the disclosure details a microcontroller than can be utilized to control illumination of a first type of charge port assembly or instead be utilized to control illumination of a different, second type of charge port assembly.

Figure 1:
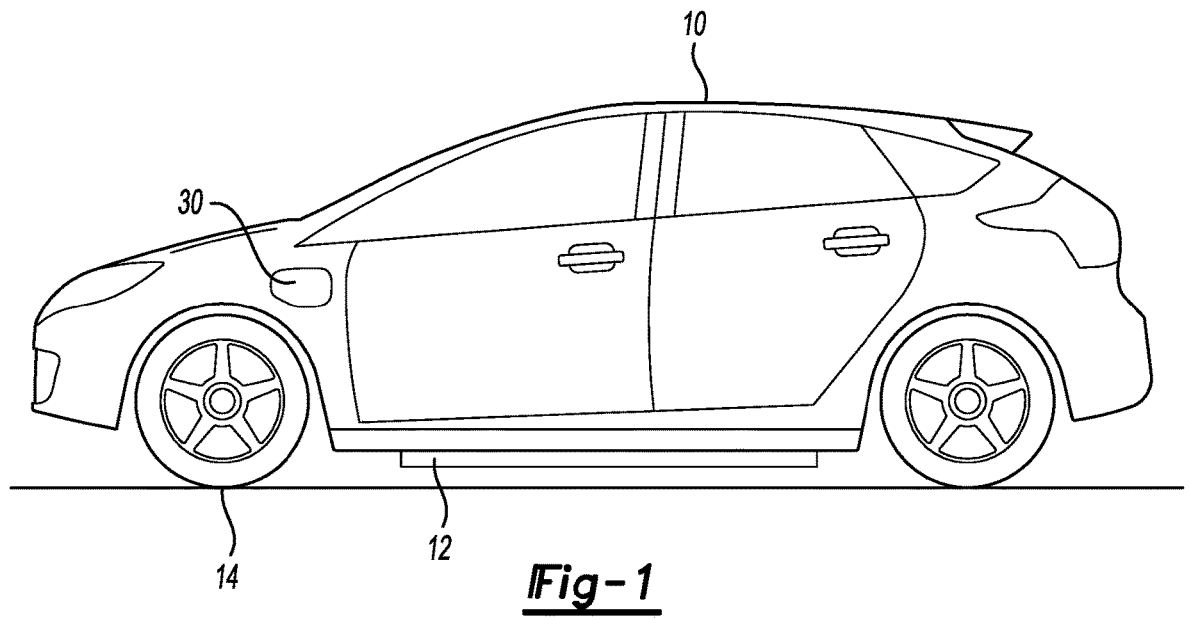
FIG. 1 illustrates a side view of an example electrified vehicle having a charge port and a charge port door in a closed position.
Figure 2:
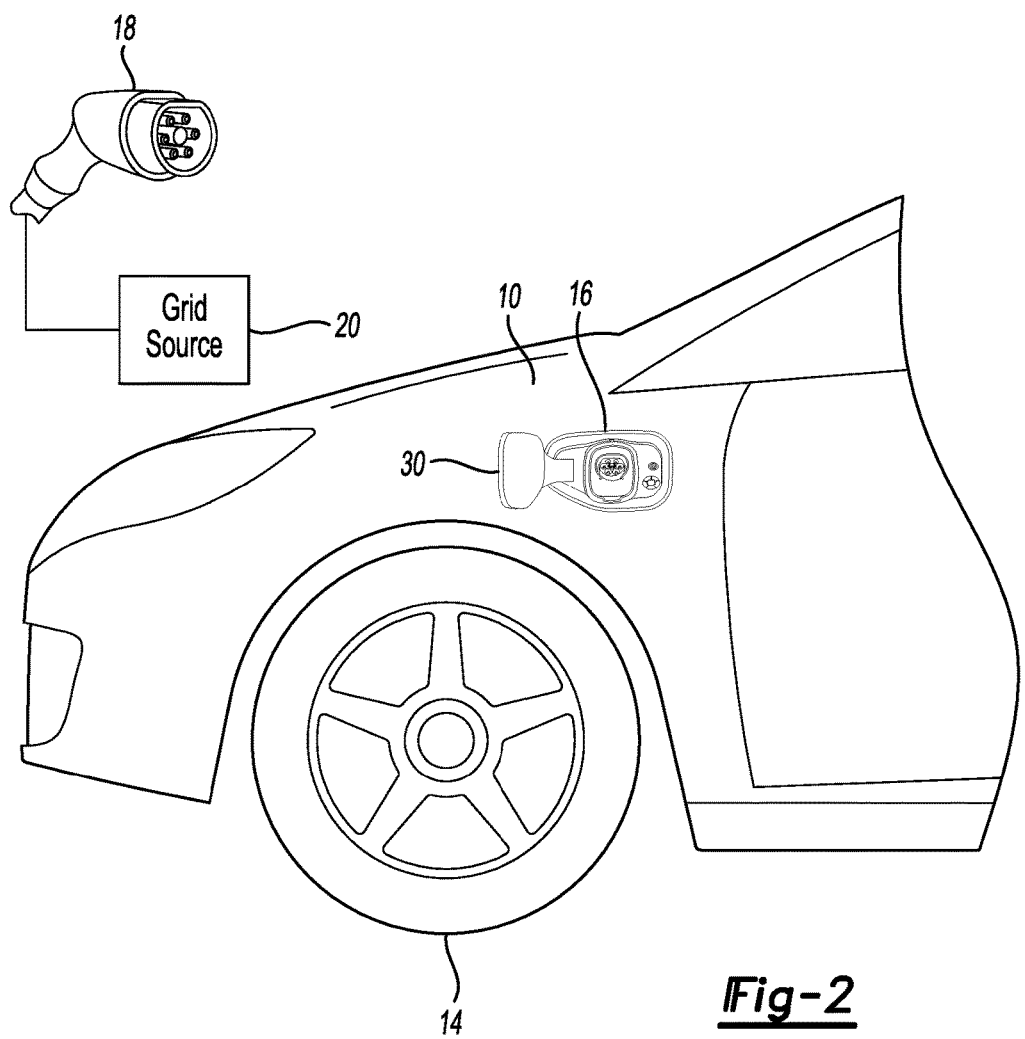
FIG. 2 illustrates a close-up view of the charge port of the electrified vehicle with the charge port door in an open position, along with a charger that can connect to the charge port when charging a traction battery of the electrified vehicle from an external power source.

Referring to FIGS. 1 and 2, an exemplary vehicle 10 is a battery electric vehicle (BEV) that includes a traction battery 12. The vehicle 10 can include a powertrain having a drive system that rotates drive wheels 14 utilizing torque from an electric machine that is powered by the traction battery 12. While described as a BEV, other types of vehicles having a charge port fall within the scope of this disclosure. For example, the vehicle 10 could instead be a plug-in hybrid electric vehicle (PHEV) having a charge port.

From time to time, charging the traction battery 12 is required or desirable. The vehicle 10 thus includes a charge port 16. A charger 18 can be coupled to the charge port 16 to charge the traction battery 12 of the electrified vehicle 10 from an external power source, such as a grid source 20. The grid source 20 can provide power to charge the traction battery when the charger 18 is coupled to the charge port 16. The grid source 20 can be located at a home of the user, a public charging station, etc.

The vehicle 10 includes a charge port door 30 that is closed during typical operation of the vehicle 10. When charging the vehicle 10 from the grid source 20 is desired, the charge port door 30 can move from the closed position shown in FIG. 1 to the open position shown in FIG. 2. A user can then couple the charger 18 to the charge port 16 so that power from the grid source 20 can be provided to the traction battery 12 of the vehicle 10 through the charger 18 and the charge port 16.

The exemplary charge port 16 is an AC charge port that receives AC power from the grid source 20. In another example, the charge port 16 is a DC charge port that receives DC power from the grid source 20. In yet another example, the charge port 16 is a combined AC/DC charge port that can received AC or DC power from the grid source 20.

Figure 3:
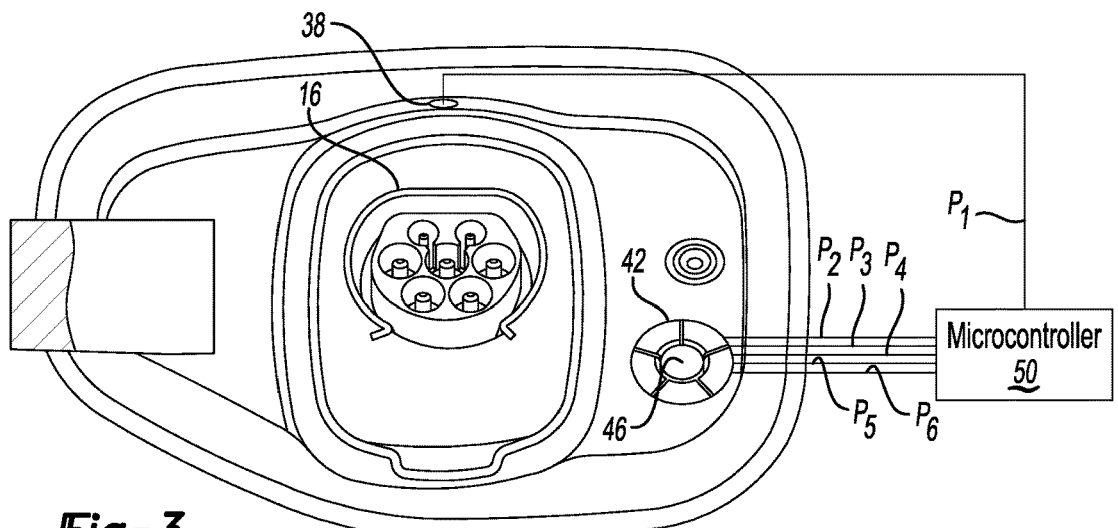
FIG. 3 illustrates a first charge port assembly from the vehicle of FIGS. 1 and 2 along with a schematically represented microcontroller.

With reference now to FIG. 3 and continuing reference to FIGS. 1 and 2, the charge port 16 is part of a first charge port assembly that additionally includes a courtesy lamp assembly 38 and a plurality of indicators 42 distributed circumferentially about a perimeter of a charger unlock button 46. The courtesy lamp assembly 38 is a lighting device that, in the exemplary embodiment, includes at least one light emitting diode (LED). The indicators 42, in the exemplary embodiment, are also lighting devices that each include an LED.

A microcontroller 50 is operably coupled to the courtesy lamp assembly 38 and each of the indicators 42. The microcontroller 50 can activate the courtesy lamp assembly 38 such that the courtesy lamp assembly 38 is illuminated. In the exemplary embodiment, the microcontroller 50 activates the courtesy lamp assembly 38 when the charge port door 30 is in the open position.

The courtesy lamp assembly 38 is, in the exemplary embodiment, directly vertically above the charge port 16. Vertical, for purposes of this disclosure, refers to the general orientation of the vehicle 10 with respect to ground during ordinary operation of the vehicle 10. Thus, when the courtesy lamp assembly 38 is activated, light emitted from the courtesy lamp assembly 38 illuminates the charge port 16 and the surrounding areas. Light from the courtesy lamp assembly 38 can assist a user when, for example, coupling the charger 18 to the charge port 16 and when decoupling the charger 18 from the charge port 16.

The microcontroller 50 can further selectively activate each of the indicators 42 to cause the activated indicators 42 to emit light. The number of indicators 42 activated by the microcontroller 50 can correspond generally to a state of charge of the traction battery. For example, five indicators 42 are shown in the FIG. 3 embodiment. If the state of charge of the traction battery of the vehicle 10 is approximately 40%, the microcontroller 50 activates two of the five indicators 42, or 40% of the indicators 42. The user observing the indicators 42 would understand that, because two of the five indicators 42 are illuminated, a state of charge of the traction battery is approximately 40%.

When the charger 18 is coupled to the charge port 16, the charger 18 can be locked to prevent, for example, an unauthorized removal. The charger unlock button 46 can be pressed by an authorized user to unlock the charger 18 from the charge port 16. Unlocking the charger 18 from the charge port 16 can occur when the traction battery 12 is fully charged, for example. Pressing the charger unlock button 46 can also, in some examples, stop the charging procedure.

The exemplary microcontroller 50 is a local interconnect network (LIN) microcontroller. LIN is a communication protocol utilized to communicate between components of vehicles. The LIN protocol can communicate utilizing LIN messages (signals). In the exemplary embodiment, the microcontroller 50 can transmit a LIN message along path P1 to activate the courtesy lamp assembly 38. The microcontroller 50 could then transmit another LIN message along the path P1 to deactivate the courtesy lamp assembly. The microcontroller 50 can also transmit LIN messages along paths P2-P6 to activate or deactivate the associated one of the indicators 42.

Figure 4:
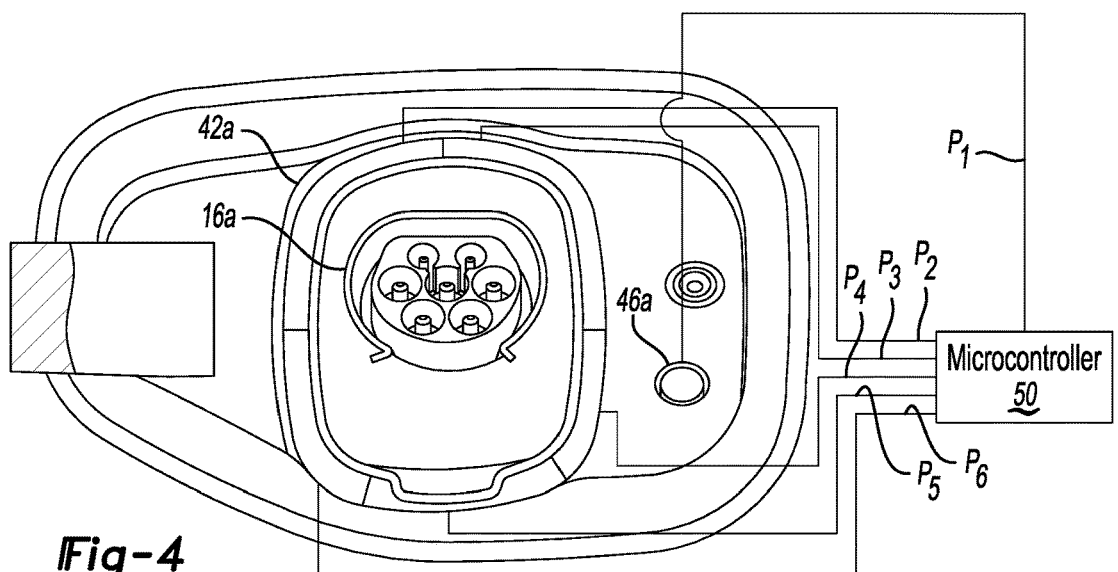
FIG. 4 illustrates a second charge port assembly for another vehicle that can optionally be controlled by the controller of FIG. 3.

With reference now to FIG. 4 and continuing reference to FIGS. 1 to 3, a second charge port assembly is shown. The second charge port assembly differs from the first charge port assembly of FIG. 3. For example, the second charge port assembly includes a second charge port 16a, a plurality of second indicators 42a distributed circumferentially about a periphery of the charge port 16a, and a charger unlock button 46a. In the second charge port assembly, the indicators 42a are lighting devices that can each includes one or more LEDs. The charger unlock button 46a is another type of lighting device, in the exemplary embodiment, and can include at least one LED. When activated, the at least one LED associated within the charger unlock button 46a can backlight the charger unlock button 46a.

Notably, the second charge port assembly does not include a courtesy lamp assembly separate from the second indicators 42a. Instead, the second indicators 42a, when illuminated, emit light to assist a user that is, for example, coupling the charger to the charge port 16a or decoupling the charger 18 from the charge port 16a.

Without requiring substantial modification or reprogramming, the microcontroller 50 can be utilized to control activation of the indicators 42a and the charger unlock button 46a. LIN messages that could be used to selectively activate the courtesy lamp assembly 38 in the first charge port assembly of FIG. 3 are instead communicated to the charger unlock button 46a. The logic for activating the charger unlock button 46a tracks the logic used for illuminating the courtesy lamp assembly 38 in the first charge port assembly of FIG. 3. That is, the microcontroller 50 activates the charger unlock button 46a when the charge port door 30 is in the open position. The indicators 42a are selectively activated utilizing LIN messages transmitted along paths P2-P6 in a manner similar to that described in connection with the indicators 42 in FIG. 3.

Accordingly, in the exemplary embodiment, the microcontroller 50 can be utilized to selectively activate the courtesy lamp assembly 38 and indicators 42 of a first charge port assembly. Also, without redesign or reprogramming, the microcontroller 50 could instead be utilized to selectively actuate the charger unlock button 46a and the indicators 42a of the second charge port assembly shown in FIG. 4. As can be appreciated, utilizing the microcontroller 50 to selectively activate the first charge port assembly or instead the second charge port assembly can reduce overall design complexity.

The microcontroller 50 can include a processor operatively linked to a memory portion. The processor can be programmed to execute a program stored in the memory portion. The program may be stored in the memory portion as software code. The program stored in the memory portion may include one or more additional or separate programs, each of which includes an ordered list of executable instructions for implementing logical functions.

The processor can be a custom made or commercially available processor, a central processing unit (CPU), or generally any device for executing software instructions. The memory portions can include any one or combination of volatile memory elements and/or nonvolatile memory elements.

The microcontroller 50, in the exemplary embodiment, is a LIN-only microcontroller that does not communicate using Controller Area Network communications. The microcontroller 50 can be programmed to command a LIN bus to wake up in response to a user input.

In an exemplary embodiment, the microcontroller 50 can rely a proximity of a magnet to a Hall effect sensor when assessing whether the charge port door 30 is open or closed. The magnet can be attached to the charge port door 30 and can move relative to the Hall effect sensor when the charge port door 30 is opened and closed.

Figure 5:
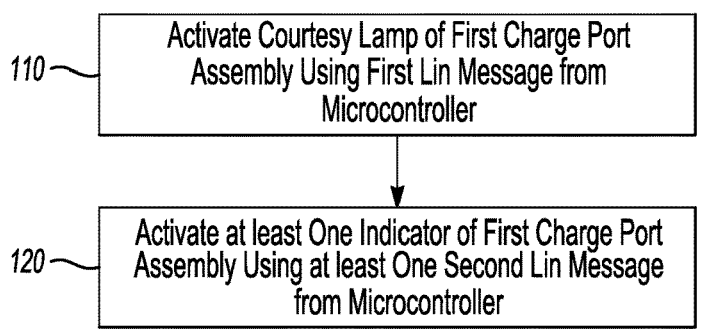
FIG. 5 illustrates a flow of an example charge port illumination method.

With reference to FIG. 5, an exemplary charge port illumination method 100 begins at the step 110 which activates a courtesy lamp of a first charge port assembly in response to at least one first LIN message sent from a microcontroller. In response to the activating, the courtesy lamp assembly illuminates a charge port of the first charge port assembly. The method further includes, at a step 120, the step of activating at least one indicator within a plurality of indicators of the first charge port assembly in response to at least one second LIN message sent from the microcontroller.

Illuminating the at least one indicator can indicate a state of charge of an associated traction battery. The microcontroller utilized within the method 100 is configured such that the microcontroller can alternatively be used in connection with a different, second charge port assembly where the microcontroller activates a charger unlock button of the second charge port assembly using the at least one first LIN message.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A charge port illumination system, comprising:
a first charge port assembly including a charge port, a courtesy lamp assembly configured to selectively activate to illuminate the charge port, and a plurality of indicators each configured to selectively activate to illuminate and indicate a state of charge of a traction battery;
a microcontroller that selectively activates the courtesy lamp assembly and selectively activates the plurality of indicators of the first charge port assembly; and a charger unlock button, the plurality of indicators distributed circumferentially about the charger unlock button.

2. The charge port illumination system of claim 1, wherein the microcontroller is a LIN microcontroller.

3. The charge port illumination system of claim 2, wherein the microcontroller is configured to selectively activate the courtesy lamp assembly by communicating a first LIN message to the courtesy lamp assembly and to selectively activate at least one of the plurality of indicators by communicating a second LIN message to the at least one of the plurality of indicators.

4. The charge port illumination system of claim 3, wherein the charge port assembly is a first charge port assembly, wherein the microcontroller is configured to be alternatively used with a different, second charge port assembly and activates a charger unlock button of the second charge port assembly by communicating the first LIN message to the charger unlock button to cause the charger unlock button to illuminate.

5. The charge port illumination system of claim 4, wherein the second charge port assembly includes a second charge port and a plurality of second indicators distributed circumferentially about the second charge port, the microcontroller configured to selectively activate at least one of the second indicators by communicating the second LIN message to the at least one of the second indicators to cause the at least one of the second indicators to illuminate.

6. The charge port illumination system of claim 1, further comprising a charge port door movable between a closed position and an open position, the charge port covered by the charge port door when the charge port door is in the closed position, the charge port uncovered by the charge port door when the charge port door is in the open position, wherein the courtesy lamp assembly and the plurality of indicators are covered by the charge port door in the closed position, and the courtesy lamp assembly and the plurality of indicators are uncovered by the charge port door in the open position, wherein the courtesy lamp assembly and the plurality of indicators are separate and distinct from each other.

7. The charge port illumination system of claim 6, wherein the microcontroller is configured to activate the courtesy lamp assembly such that the courtesy lamp assembly is illuminated when the charge port door is open and is not illuminated when the charge port door is closed.

8. The charge port illumination system of claim 1, wherein the courtesy lamp assembly is disposed exclusively vertically above the charge port.

9. The charge port illumination system of claim 1, wherein the courtesy lamp assembly includes at least one Light Emitting Diode, wherein each of the indicators within the plurality of indicators includes at least one Light Emitting Diode, the courtesy lamp assembly forming no portion of the indicators.

10. The charge port illumination system of claim 1, wherein the plurality of indicators are distributed circumferentially about an area, wherein the charge port is spaced a distance from the area such that the plurality of indicators are not distributed circumferentially about the charge port.

11. A charge port illumination system, comprising:
 a first charge port assembly having a charge port of an electrified vehicle, a courtesy lamp assembly disposed vertically above the charge port and configured to selectively illuminate the charge port, a plurality of indicators each configured to selectively illuminate to indicate a state of charge of a traction battery, and a charger unlock button, the plurality of indicators distributed circumferentially about the charger unlock button;
 a charge port door moveable between a closed position and an open position, the charge port covered by the charge port door when the charge port door is in the closed position, the charge port uncovered by the charge port door when the charge port door is in the open position, wherein the courtesy lamp assembly and the plurality of indicators are covered by the charge port door in the closed position, and the courtesy lamp assembly and the plurality of indicators are uncovered by the charge port door in the open position; and
 a LIN microcontroller that controls illumination of both the courtesy lamp assembly and the plurality of indicators, wherein the microcontroller is configured to activate the courtesy lamp assembly using a first LIN message and to activate at least one of the plurality of indicators using at least one second LIN message, wherein the LIN microcontroller is configured such that the LIN microcontroller can be alternatively used in connection with a different, second charge port assembly where the LIN microcontroller activates a charger unlock button of the second charge port assembly using the first LIN message.

12. A charge port illumination method, comprising:
 activating a courtesy lamp of a first charge port assembly in response to at least one first LIN message sent from a microcontroller, the courtesy lamp assembly illuminating a charge port of the first charge port assembly when activated; and
 activating at least one indicator within a plurality of indicators of the first charge port assembly in response to at least one second LIN message sent from the microcontroller, the at least one indicator illuminating to indicate a state of charge of a traction battery,
 wherein the microcontroller is configured such that the microcontroller can be alternatively used in connection with a different, second charge port assembly where the microcontroller activates a charger unlock button of the second charge port assembly using the at least one first LIN message.

13. The charge port illumination method of claim 12, wherein the microcontroller activates the courtesy lamp and the at least one indicator when a charge port door is an open position, and deactivates the courtesy lamp and the at least one indicator when the charge port door is in a closed position.

14. The charge port illumination method of claim 12, wherein the plurality of indicators are distributed circumferentially about a charger unlock button of the first charge port assembly.

15. The charge port illumination method of claim 12, wherein the courtesy lamp is vertically directly above the charge port.

16. The charge port illumination method of claim 12, wherein the courtesy lamp includes at least one Light Emitting Diode, wherein each of the indicators within the plurality of indicators includes at least one Light Emitting Diode.

17. The charge port illumination method of claim 13, wherein the microcontroller within the second charge port assembly is configured to activate at least one second indicator within a plurality of second indicators of the second charge port assembly using the at least one second LIN message, the plurality of second indicators distributed circumferentially about a charge port of the second charge port assembly to illuminate the charge port of the second charge port assembly.

18. The charge port illumination method of claim 13, wherein activating of the courtesy lamp is based on the charge port door being open or closed.

19. The charge port illumination method of claim 14, wherein the plurality of indicators are distributed about an area of the charge port assembly that does not include the charge port.

* * * * *